US012224504B2

(12) United States Patent
Ilvonen et al.

(10) Patent No.: US 12,224,504 B2
(45) Date of Patent: Feb. 11, 2025

(54) ANTENNA ARRANGEMENT AND COMMUNICATION DEVICE

(71) Applicant: HUAWEI TECHNOLOGIES CO., LTD., Shenzhen (CN)

(72) Inventors: Janne Ilvonen, Helsinki (FI); Jari-Matti Hannula, Espoo (FI); Riku Kormilainen, Espoo (FI); Anu Lehtovuori, Espoo (FI); Rasmus Luomaniemi, Espoo (FI); Ville Viikari, Espoo (FI); Alexander Khripkov, Helsinki (FI); Joonas Krogerus, Helsinki (FI)

(73) Assignee: Huawei Technologies Co., Ltd., Shenzhen (CN)

( * ) Notice: Subject to any disclaimer, the term of this patent is extended or adjusted under 35 U.S.C. 154(b) by 160 days.

(21) Appl. No.: 17/975,253

(22) Filed: Oct. 27, 2022

(65) Prior Publication Data

US 2023/0118728 A1 Apr. 20, 2023

Related U.S. Application Data

(63) Continuation of application No. PCT/EP2020/061638, filed on Apr. 27, 2020.

(51) Int. Cl.
*H01Q 1/24* (2006.01)
*H01Q 9/04* (2006.01)

(52) U.S. Cl.
CPC ......... *H01Q 9/0414* (2013.01); *H01Q 9/0421* (2013.01)

(58) Field of Classification Search
CPC .... H01Q 9/0414; H01Q 9/0421; H01Q 1/243; H01Q 9/045; H01Q 9/0442; H01Q 9/0407; H01Q 3/36
See application file for complete search history.

(56) References Cited

U.S. PATENT DOCUMENTS 5,410,323 A * 4/1995 Kuroda ................ H01Q 9/0428 343/846
6,771,223 B1 * 8/2004 Shoji .................... H01Q 9/0407 343/702

(Continued)

FOREIGN PATENT DOCUMENTS

CN 106058450 A 10/2016
CN 109742540 A 5/2019
JP H05304413 A 11/1993

OTHER PUBLICATIONS

Liu et al., "Metamaterial-Based Low-Profile Broadband Mushroom Antenna," IEEE Transactions on Antennas and Propagation, vol. 62, No. 3, doi: 10.1109/TAP.2013.2293788, Total 8 pages, Institute of Electrical and Electronics Engineers, New York, New York (Mar. 2014).

(Continued)

*Primary Examiner* — Hai V Tran
*Assistant Examiner* — Bamidele A Immanuel
(74) *Attorney, Agent, or Firm* — Leydig, Voit & Mayer, Ltd.

(57) ABSTRACT

An antenna arrangement for a communication device comprises a top conductive patch comprising at least a first coupling point and a second coupling point coupled to one or more feed circuits carrying a radio frequency (RF) signal to or from the top conductive patch. The RF signal has a first phase in the first coupling point and a second phase in the second coupling point. A first slot extends in the conductive patch between the first coupling point and the second coupling point. The antenna arrangement according enables a desired current distribution to be realized in the antenna in a controlled and systematic manner. A communication device includes such an antenna arrangement.

19 Claims, 8 Drawing Sheets

(56) References Cited

U.S. PATENT DOCUMENTS

| | | | | |
|---|---|---|---|---|
| 6,836,248 | B2 * | 12/2004 | Fukushima | H01Q 9/0421 343/846 |
| 7,868,841 | B2 | 1/2011 | Pettus | |
| 8,416,031 | B2 * | 4/2013 | Dupuy | H01P 1/2039 333/101 |
| 9,287,630 | B2 * | 3/2016 | Choudhury | H01Q 13/106 |
| 9,379,449 | B2 | 6/2016 | Cetiner et al. | |
| 10,056,922 | B1 * | 8/2018 | Tsvelykh | H01P 1/20 |
| 2006/0256015 | A1 * | 11/2006 | Park | H01Q 9/30 343/702 |
| 2009/0058731 | A1 * | 3/2009 | Geary | H01Q 5/378 343/700 MS |
| 2009/0073059 | A1 * | 3/2009 | Ikegaya | H01Q 9/42 343/702 |
| 2009/0196371 | A1 * | 8/2009 | Yamamoto | H04B 7/0808 375/267 |
| 2010/0207823 | A1 * | 8/2010 | Sakata | H01Q 9/285 343/702 |
| 2010/0289701 | A1 * | 11/2010 | DeJean | H01Q 9/0414 343/700 MS |
| 2010/0321253 | A1 * | 12/2010 | Ayala Vazquez | H01Q 13/18 343/702 |
| 2011/0165915 | A1 * | 7/2011 | Kim | H04M 1/0266 345/173 |
| 2011/0254749 | A1 * | 10/2011 | Amari | H01Q 9/0442 343/858 |
| 2012/0007785 | A1 * | 1/2012 | Amari | H01Q 9/0407 343/722 |
| 2013/0113673 | A1 | 5/2013 | Kyriazidou | |
| 2014/0225787 | A1 * | 8/2014 | Ramachandran | H01Q 13/10 343/702 |
| 2019/0273325 | A1 | 9/2019 | Ryoo et al. | |

OTHER PUBLICATIONS

Cai et al., "A Low-Profile Frequency Reconfigurable Grid-Slotted Patch Antenna," IEEE Access, vol. 6, doi: 10.1109/Access.2018.2850926, Total 8 pages, Institute of Electrical and Electronics Engineers, New York, New York (Jun. 27, 2018).

Soltani et al., "Design and Optimization of Multiport Pixel Antennas," IEEE Transactions on Antennas and Propagation, vol. 66, No. 4, doi: 10.1109/TAP.2018.2800759, Total 6 pages, Institute of Electrical and Electronics Engineers, New York, New York (Apr. 2018).

Rodrigo et al., "Frequency, Radiation Pattern and Polarization Reconfigurable Antenna Using a Parasitic Pixel Layer," IEEE Transactions on Antennas and Propagation, vol. 62, No. 6, doi: 10.1109/TAP.2014.2314464, Total 6 pages, Institute of Electrical and Electronics Engineers, New York, New York (Jun. 2014).

Yang et al., "Analysis and Design of a Broadband Multifeed Tightly Coupled Patch Array Antenna," IEEE Antennas and Wireless Propagation Letters, vol. 17, No. 2, doi: 10.1109/LAWP.2017.2780992, Total 4 pages, Institute of Electrical and Electronics Engineers, New York, New York (Feb. 2018).

Duan et al., "Multi-feed and Multi-polarization Patch Antenna Based on Multiport S-parameter Matrix Theory," 2018 International Symposium on Antennas and Propagation (ISAP), Busan, South Korea, Total 2 pages (Oct. 2018).

Singh et al., "Low-Profile Wideband Differentially Fed Di-Patch Antenna Closely Above Metallic Ground," IEEE Antennas and Wireless Propagation Letters, vol. 18, No. 5, doi: 10.1109/LAWP.2019.2906825, Total 5 pages, Institute of Electrical and Electronics Engineers, New York, New York (May 2019).

Bianchi et al., "Fast Optimization of Ultra-Broadband Antennas With Distributed Matching Networks," IEEE Antennas and Wireless Propagation Letters, vol. 13, doi: 10.1109/LAWP.2014.2312981, Total 4 pages, Institute of Electrical and Electronics Engineers, New York, New York (Apr. 2014).

* cited by examiner

<u>112; 120</u>

ANTENNA ARRANGEMENT AND COMMUNICATION DEVICE

CROSS-REFERENCE TO RELATED APPLICATIONS

This application is a continuation of International Application No. PCT/EP2020/061638, filed on Apr. 27, 2020, the disclosure of which is hereby incorporated by reference in its entirety.

TECHNICAL FIELD

The present disclosure relates to an antenna arrangement for a communication device. The disclosure further relates to a communication device comprising such an antenna arrangement.

BACKGROUND

Currently antennas in mobile devices, such as user equipments (UEs), need to be placed in lossy and challenging environments, and yet provide efficient radiation. This calls for practical antenna structures approaching the ultimate efficiency limits for small antennas. Finding the optimal antenna shape may be very challenging and laborious due to high computational burden of electromagnetic simulations and complex relation between antenna shape and its electrical properties. Hence, there is no guarantee that the designer can find the optimal solution.

The theoretical and numerical electromagnetics research community focuses on finding mathematically optimal solutions. The research community has derived fundamental limitations for the antennas, such as the famous Chu's limit defining the upper limit for the performance of an electrically small antenna in terms of bandwidth and efficiency. The research community has also established relatively straightforward ways to find the ultimately best current or field distributions of an antenna, which could result in the best possible radiation properties. However, incorporating such optimal current distributions into practical antenna design is challenging.

SUMMARY

Embodiments of the disclosure provide a solution which mitigates or solves drawbacks and problems of conventional solutions.

According to a first aspect of the disclosure, an antenna arrangement for a communication device is provided, the antenna arrangement comprising:

- a substrate having a top surface and a bottom surface,
- a top conductive patch arranged on the top surface, the top conductive patch comprising a first section and a second section adjoining the first section,
- a bottom conductive patch arranged on the bottom surface opposite to the top conductive patch,
- one or more feed circuits configured to carry a radio frequency, RF, signal to or from the top conductive patch,
- wherein the top conductive patch comprises two or more coupling points in which the top conductive patch is coupled to the one or more feed circuits, the two or more coupling points comprising a first coupling point located in the first section and a second coupling point located in the second section, such that the RF signal has a first phase in the first coupling point and a second phase in the second coupling point, and wherein
- a first slot extends in the top conductive patch between the first coupling point and the second coupling point.

The top conductive patch can act as an antenna for capturing or radiating a RF signal and may generally be of a design known in the art as a patch antenna. The top conductive patch can hence herein further be referred to as an antenna patch. The bottom conductive patch can act as a ground plane and can herein further be referred to as a ground patch.

A coupling point can herein be understood to correspond to a point-like region with a spatial extension which is small compared to the area of the top conductive patch.

An advantage of the antenna arrangement according to the first aspect is that multiple feed points in the form of coupling points make it possible to better control the current distribution in the antenna structure as compared to a single-feed antenna with only one coupling point. Better control of current distribution makes it possible to achieve high radiation efficiency, desired directive or polarization properties, and/or desired input impedance.

In an implementation form of an antenna arrangement according to the first aspect, the antenna arrangement further comprises

- a first controllable capacitor arranged at the first slot and configured to vary the electrical length of the first slot.

An advantage of the antenna arrangement according to this implementation form is that the controllable capacitor makes it possible to control the current distribution on the antenna and even better compared to case where the antenna is fixed. Better control of current distribution makes it easier to maintain high radiation efficiency, good matching, and possible other radiation properties across a wider frequency band in different use scenarios, for instance if a user's hand is in the proximity of the antenna.

In an implementation form of an antenna arrangement according to the first aspect, the first slot has an open end and a closed end, and the first controllable capacitor is arranged between the open end and the closed end of the first slot. The first controllable capacitor may further be arranged at the open end or at the closed end of the first slot.

An advantage of the antenna arrangement according to this implementation form is that potentially high electric field is formed across the slot/gap and consequently the effect of the controllable capacitor on the currents is increased. The slot potentially increases the current controllability with the controllable capacitor.

In an implementation form of an antenna arrangement according to the first aspect, the second phase is 180 degrees phase rotated in relation to the first phase.

An advantage of the antenna arrangement according to this implementation form is that a 180 degree phase offset between the feeds of the different coupling points commonly results into a high efficiency and good impedance matching. Furthermore, the 180 degree phase difference is straightforward to realize with several different passive structures.

In an implementation form of an antenna arrangement according to the first aspect, the antenna arrangement further comprises

- a third coupling point located in the first section such that the RF signal has a third phase in the third coupling point,
- a fourth coupling point located in the second section such that the RF signal has a fourth phase in the fourth coupling point, and a second slot extending in the top conductive patch and being arranged between the third coupling point and the fourth coupling point.

An advantage of the antenna arrangement according to this implementation form is that the controllability of the antenna improves with an increasing number of coupling points/feeds. As compared to two coupling point case, four coupling points potentially offer better electrical antenna performance.

In an implementation form of an antenna arrangement according to the first aspect, the first phase and the third phase have the same phase and the second phase and the fourth phase have the same phase; or the first phase, the second phase, the third phase and the fourth phase have different phases.

An advantage of the antenna arrangement according to this implementation form is the fixed feed phases result to simpler feed structure than a realization, where feed phases are variables. Relatively good performance can typically be obtained even across a relatively wide band using fixed feed phases. This way no controllable RF phase shifters are needed and the feed structure is simpler.

In an implementation form of an antenna arrangement according to the first aspect, the antenna arrangement further comprises a second controllable capacitor arranged at the second slot and configured to vary the electrical length of the second slot.

An advantage of the antenna arrangement according to this implementation form is that current controllability improves with the number of controllable capacitors on the antenna. Better controllability makes it possible to conserve a good matching, high efficiency, and other performance parameters across wider band and broader set of use cases. Furthermore, larger number of controllable capacitors potentially result into more uniform current distribution on the structure. More uniform current distribution consequently results into lower conduction losses.

In an implementation form of an antenna arrangement according to the first aspect, the second slot has an open end and a closed end, and the second controllable capacitor is arranged between the open end and the closed end of the second slot. The second controllable capacitor may further be arranged at the open end or at the closed end of the second slot.

An advantage of the antenna arrangement according to this implementation form is that the electric field across the slot is typically large, especially near the open end of the slot and far from the closed end of the slot. The larger the electric field across the controllable capacitor, the larger is its potential effect on the current distribution. Therefore, the controllability of the structure with the controllable capacitors can be improved by introducing a slot and placing a controllable capacitor across it.

In an implementation form of an antenna arrangement according to the first aspect, the open end of the first slot and the open end of the second slot are arranged on opposite sides of the top conducting patch.

An advantage of the antenna arrangement according to this implementation form is that this kind of structure with symmetrical layout could lead to fairly uniform current distribution and yet good current controllability. Uniform current distribution potentially leads to lower conduction losses.

In an implementation form of an antenna arrangement according to the first aspect, the first slot and the second slot extend in opposite directions and are aligned with each other.

An advantage of the antenna arrangement according to this implementation form is that this symmetric arrangement leads to symmetric feed port impedances and feed signal phases. This potentially results into simplified feed network and makes it easier to use fixed 180 degree phase shifted feed signals.

In an implementation form of an antenna arrangement according to the first aspect, the first slot and the second slot at least partially demarks the first section and the second section from each other.

In an implementation form of an antenna arrangement according to the first aspect, the first coupling point, the second coupling point, the third coupling point and the fourth coupling point are symmetrically arranged on the top conductive patch.

An advantage of the antenna arrangement according to this implementation form is that this symmetric arrangement leads to symmetric feed port impedances and feed signal phases. This potentially results into simplified feed network and makes it easier to use fixed 180 degree phase shifted feed signals.

In an implementation form of an antenna arrangement according to the first aspect, the RF signal in each coupling point have the same amplitude.

An advantage of the antenna arrangement according to this implementation form is that the feed network is potentially simpler as compared to a case where feed signal amplitudes should be arbitrary or controllable.

In an implementation form of an antenna arrangement according to the first aspect, the antenna arrangement further comprises a single feed circuit configured to carry the RF signal, a power divider coupled to the single feed circuit and configured to divide the RF signal to each coupling point and a phase shifter for each coupling point wherein each phase shifter is coupled to the power divider and is configured to control the phase of the RF signal provided to its respective coupling point.

An advantage of the antenna arrangement according to this implementation form is that variable phase shifters provide good control of current distribution in the antenna structure. This makes it possible to achieve a good performance over a wide set of use cases and across a wide band. On the other hand, variable phase shifters realized with integrated circuit technology can be very inexpensive, small and easy to integrate with the antenna. It should be noted that also the power divider can be realized inside a multi-channel phase shifter chip. When using a multi-channel phase shifter chip, single chip could feed the whole antenna structure.

In an implementation form of an antenna arrangement according to the first aspect, the antenna arrangement further comprises at least one of a first feed circuit configured to carry the RF signal with the first phase, a second feed circuit configured to carry the RF signal with the second phase, a third feed circuit configured to carry the RF signal with the third phase, and a fourth feed circuit configured to carry the RF signal with the fourth phase.

An advantage of the antenna arrangement according to this implementation form is that no power dividers or phase shifters are needed.

According to a second aspect of the disclosure, a communication device is provided for a wireless communication system, the communication device comprising an antenna arrangement according to any one of the preceding implementation forms of an antenna arrangement according to the first aspect.

In an implementation form of a communication device according to the second aspect, the communication device comprises a chassis, a glass layer, a dielectric layer arranged between the chassis and the glass layer;

and wherein the antenna arrangement is arranged between the chassis and the dielectric layer.

Further applications and advantages will be apparent from the following detailed description.

BRIEF DESCRIPTION OF THE DRAWINGS

The appended drawings are intended to clarify and explain different embodiments, in which.

DETAILED DESCRIPTION

An optimal current or field distributions of an antenna can be theoretically determined using numerical optimization. However, incorporating optimal current distributions into practical antenna design is challenging. The calculated antenna structures are often simple in geometry, far from the complicated models of antenna structures in modern wireless devices. A major challenge is that the obtained current distribution is difficult to excite in practice, as any practical excitation element easily alters the optimal distribution.

Conventional antenna solutions for obtaining optimal current distribution includes: parasitic metal pixel layers excited through aperture coupling or by a single antenna, collaboratively fed antenna elements, multifeed patch antennas, two separated patches fed with differential signal, pixelized/gridded antennas having single feed or two separate feeds.

The conventional solutions suffer from problems such as e.g. non-optimal feed of the antenna, that complex excitations are used, and that relatively thick antennas are needed. Thus, none of the conventional solution manages to provide an optimal current distribution in an antenna in a controlled and systematic manner.

The above-mentioned drawbacks are addressed and the current distribution is improved in antenna arrangements disclosed herein. The improved current distribution is achieved with an antenna arrangement that enables a desired current distribution to be realized in the antenna in a controlled and systematic manner.

Figure 1A:
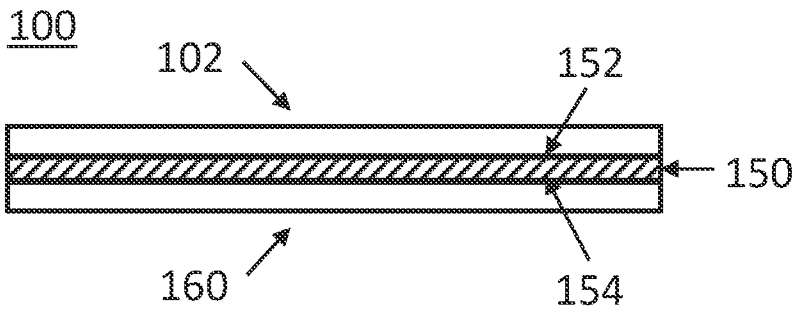
FIGS. 1*a*-*b* show an antenna arrangement according to an embodiment.
Figure 1B:
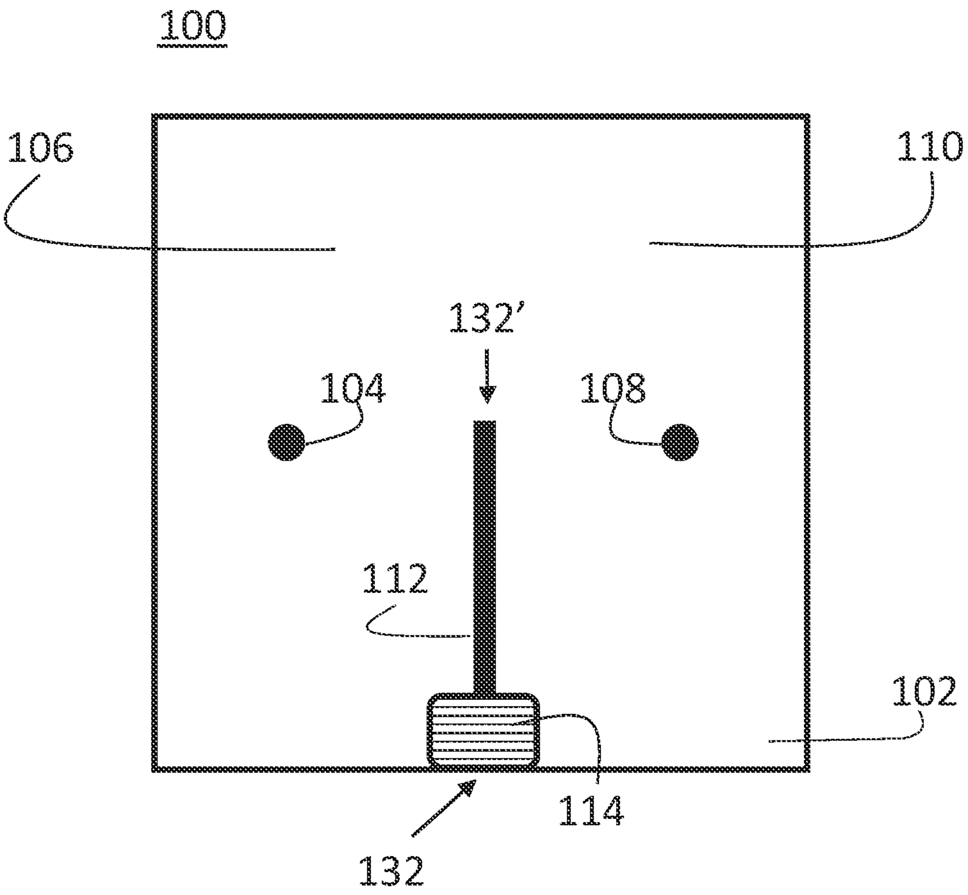

FIGS. 1*a*-*b* shows an embodiment of an antenna arrangement 100 for a communication device 200 according to various embodiments. The antenna arrangement 100 comprises a substrate 150 upon which a top conductive patch 102 and a bottom conductive patch 160 are arranged. The antenna arrangement 100 further comprises one or more feed circuits 142*a*, 142*b*, 142*c*, . . . , 142*d* (shown in FIGS. 5-6) configured to carry a radio frequency (RF) signal to or from the top conductive patch 102.

With reference to FIG. 1*a*, the substrate 150 has a top surface 152 and a bottom surface 154. The top conductive patch 102 is arranged on the top surface 152 and the bottom conductive patch 160 is arranged on the bottom surface 154 opposite to the top conductive patch 102. The top conductive patch 102 can be configured to act as an antenna for absorbing or radiating RF signals and may generally be of a design knows in the art as a patch antenna. The top conductive patch 102 can hence herein further be referred to as an antenna patch. The bottom conductive patch 160 can be configured to act as a ground plane and can herein further be referred to as a ground patch.

The top conductive patch 102 comprises a first section 106 and a second section 110 adjoining the first section 106, as shown in FIG. 1*b*. The top conductive patch 102 further comprises two or more coupling points in which the top conductive patch 102 is coupled to the one or more feed circuits 142*a*, 142*b*, 142*c*, . . . , 142*d*. A coupling point can herein be understood to correspond to a point-like area with a spatial extension which is small compared to the area of the top conductive patch 102. The area of the coupling point may e.g. be less than 10 to 1 percent of the area of the top conductive patch 102. The two or more coupling points may further be active or passive ports. An active port can be fed from a transceiver and a passive port can be loaded with an impedance, e.g. a capacitor, an inductor, an open circuit, a short circuit, a transmission line section. The impedance loading can be realized with lumped or distributed components. For example, with lumped elements or with inductors or capacitors integrated on a printed circuit board (PCB) monolithically, i.e. by patterning the metal layers properly, or by patterning a transmission line section.

In the embodiment shown in FIGS. 1*a*-*b*, the top conductive patch 102 comprises two coupling points, a first coupling point 104 located in the first section 106 and a second coupling point 108 located in the second section 110. The top conductive patch 102 is coupled to the one or more feed circuits 142*a*, 142*b*, 142*c*, . . . , 142*d* in the first coupling point 104 and the second coupling point 108 such that the RF signal to or from the top conductive patch 102 has a first phase P1 in the first coupling point 104 and a second phase P2 in the second coupling point 108. The RF signal in the first coupling point 104 and the second coupling point 108, respectively, may have the same amplitude but different phases. Thus, the second phase P2 may be different from the first phase P1. In embodiments, the second phase P2 is 180 degrees phase rotated in relation to the first phase P1.

The top conductive patch 102 further comprises a first slot 112 extending in the top conductive patch 102 between the first coupling point 104 and the second coupling point 108, as shown in FIG. 1*b*. The first coupling point 104 and the second coupling point 108 may hence be located on opposite sides of the first slot 112. The first slot 112 may further be arranged to extend on a border between the first section 106 and the second section 110 and hence at least partly demark the first section 106 from the second section 110.

A first controllable capacitor 114 may be arranged at the first slot 112 and configured to vary the electrical length of the first slot 112. The first controllable capacitor 114 may hence tune the electrical length of the first slot 112 and hence the resonant frequency of the antenna arrangement 100. Controllable capacitor can be for instance a varactor diode, ferroelectric varactor, or switchable capacitor bank realized with integrated circuit or MEMS (microelectromechanical systems) technology. The varactor diode and ferroelectric varactor are analogue devices and their capacitance is controlled by a DC (direct current) bias voltage or current. They are typically connected to the antenna circuit using DC block capacitors and RF choke inductors to separate bias circuit from the RF circuit. Capacitor banks are typically digital components. They have separate ports for RF signal and digital control signal. The digital control signal is used to select the capacitance of the component from a set of discrete capacitance states available. The capacitance affects the current distribution on the antenna structure, and the current distribution subsequently determines all the electrical properties of the antenna, including input impedance, radiation efficiency, radiation pattern and polarization. Therefore, by varying/altering the capacitance, the properties of the antenna can be controlled.

With reference to FIG. 1*b*, the first slot 112 may have an open end 132 and a closed end 132', and the first controllable capacitor 114 may be arranged between the open end 132 and the closed end 132' of the first slot 112. The first controllable capacitor 114 may be arranged anywhere along the first slot 112 including the ends 132, 132'. Typically, the electric field across the slot is highest at its open end. Consequently, the larger the voltage across the capacitor, the more it likely affects the current distribution. Potentially largest tuning effect is achieved by placing the capacitor at the open end of the slot. Thus, the first controllable capacitor 114 may in embodiments be arranged at the open end 132 or at the closed end 132' of the first slot 112. In the embodiment shown in FIG. 1, the first controllable capacitor 114 is arranged at the open end 132 of the first slot 112.

Figure 2:
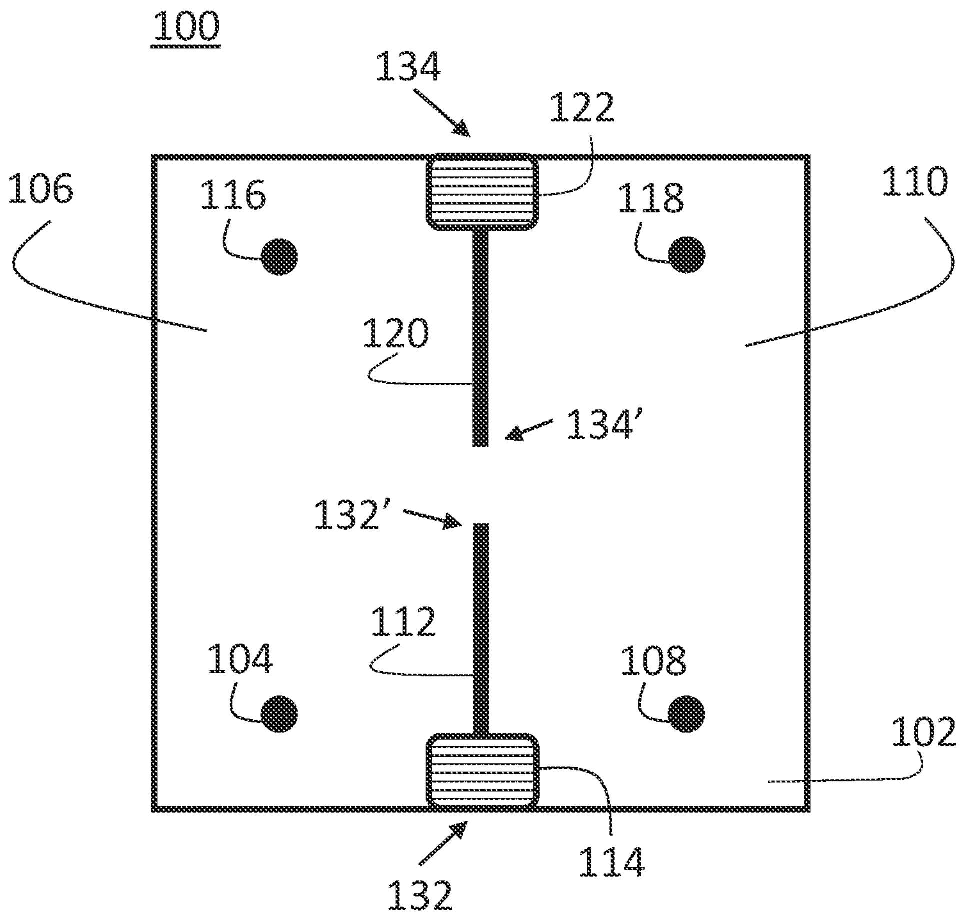
FIG. 2 shows an antenna arrangement according to an embodiment.
Figure 3A:
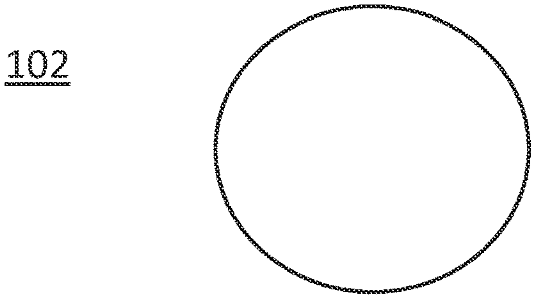
FIGS. 3*a*-3*e* illustrate different exemplary shapes of a top conductive patch of the antenna arrangement.
Figure 3B:
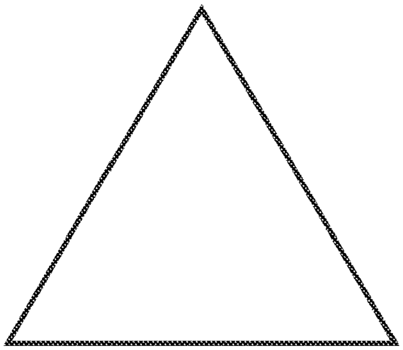
Figure 3C:
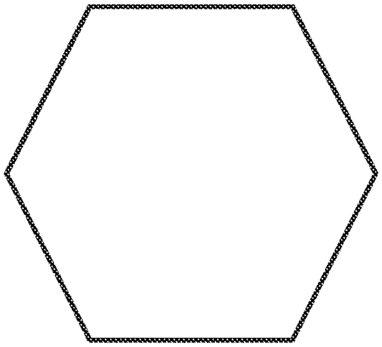
Figure 3D:
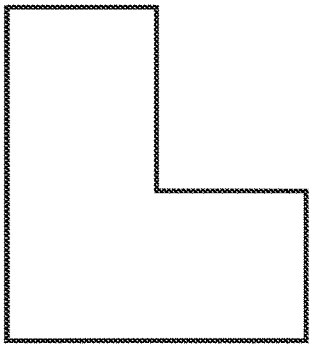
Figure 3E:
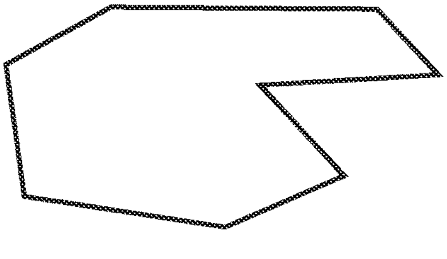
Figure 4A:
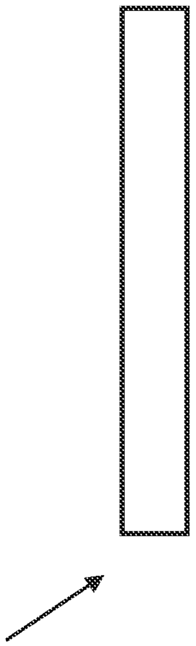
FIGS. 4*a*-4*e* illustrate different exemplary shapes of slots of the antenna arrangement.
Figure 4B:
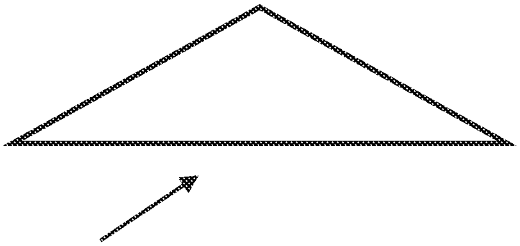
Figure 4C:
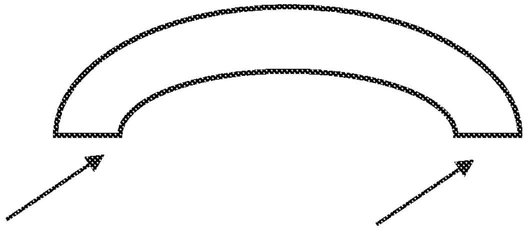
Figure 4D:
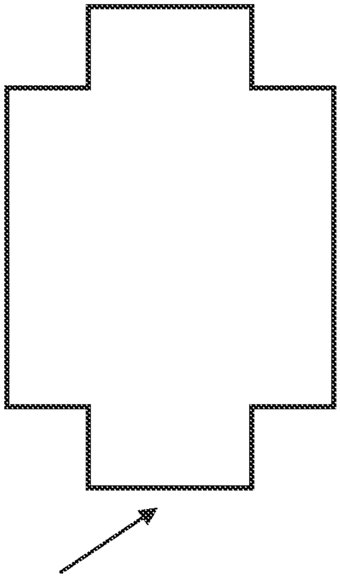
Figure 4E:
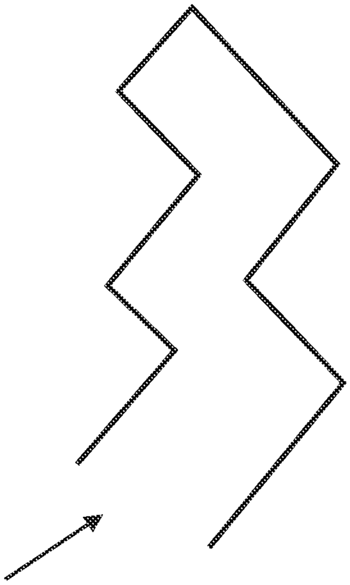

FIG. 2 shows a further embodiment of an antenna arrangement 100 for a communication device 200 according to various embodiments. In the embodiment shown in FIG. 2, the antenna arrangement 100 comprises a top conductive patch 102 and four coupling points. The first and second coupling points 104, 108, described with reference to FIG. 1*b*, and further a third coupling point 116 and a fourth coupling point 118. The third coupling point 116 is located in the first section 106 such that the RF signal has a third phase P3 in the third coupling point 116, while the fourth coupling point 118 is located in the second section 110 such that the RF signal has a fourth phase P4 in the fourth coupling point 118. The RF signal in each coupling point 104, 108, 116, 118 may have the same amplitude.

In embodiments, the first phase P1 and the third phase P3 have the same phase and the second phase P2 and the fourth phase P4 have the same phase. In such embodiments, the second phase P2 and the fourth phase P4 may be 180 degrees phase rotated in relation to the first phase P1 and the third phase P3. However, the first phase P1, the second phase P2, the third phase P3 and the fourth phase P4 may in embodiments instead have different phases. A 180 degree phase difference between the ports typically result in good radiation properties and impedance matching, especially when the structure is symmetric. If the antenna is asymmetric, or if it is placed on asymmetric environment, e.g., on a size of a mobile phone, other than 180 degree offset feed signals might provide better performance.

With reference to FIG. 2, the first coupling point 104, the second coupling point 108, the third coupling point 116, and the fourth coupling point 118 may be symmetrically arranged on the top conductive patch 102. That the coupling points are symmetrically arranged can be understood as that the coupling points forms a symmetric pattern on the top conductive patch 102. However, other arrangements of the first coupling point 104, the second coupling point 108, the third coupling point 116 and the fourth coupling point 118 are also possible according to various embodiments. Hence, also asymmetric design or pattern is possible.

The antenna arrangement 100 with four coupling points 104, 108, 116, 118 further comprises a second slot 120 different form the first slot 112 and extending in the top conductive patch 102 and being arranged between the third coupling point 116 and the fourth coupling point 118. In a similar way as for the first slot 112, a second controllable capacitor 122 may be arranged at the second slot 120 and configured to vary the electrical length of the second slot 120. In embodiments, the second slot 120 has an open end 134 and a closed end 134'. The second controllable capacitor 122 may be arranged between the open end 134 and the closed end 134' of the second slot 120, including at the open end 134 or at the closed end 134'. In the embodiment shown in FIG. 2, the second controllable capacitor 122 is arranged at the open end 134 of the second slot 120.

With reference to FIG. 2, the open end 132 of the first slot 112 and the open end 134 of the second slot 120 may be arranged on opposite sides of the top conducting patch 102. Furthermore, the first slot 112 and the second slot 120 may extend in opposite directions and may be aligned with each other. The first slot 112 may e.g. extend from one side of the top conductive patch 102 towards the middle of the top conductive patch 102, while the second slot 120 extends from an opposite side of the top conductive patch 102 towards the middle of the top conductive patch 102 and towards the first slot 112. In this way, the first slot 112 and the second slot 120 may at least partially demark the first section 106 and the second section 110 from each other, i.e. at least partially divide the top conductive patch 102 into the first section 106 and the second section 110.

FIGS. 3*a*-3*e* illustrate different non-limiting exemplary shapes of the top conductive patch 102 of the antenna arrangement 100. As illustrated in FIGS. 3*a*-3*e*, the top conductive patch 102 may have a number of different shapes in addition to the rectangular shape disclosed in FIGS. 1 and 2. It is well known that differently shaped patches result into different current distributions and thus also different antenna properties. The best shape depends on the desired antenna properties, environment, and use cases. Often the antenna needs to be shaped so that fits in the planned application and complies with the design of the device, such as a mobile device.

FIGS. 4*a*-4*e* illustrate different non-limiting exemplary shapes of the first slot 112 and the second slot 120 of the antenna arrangement 100. As illustrated in FIGS. 4*a*-4*e*, the first slot 112 and the second slot 120 may have a number of different shapes. Furthermore, the shape of the first slot 112 and the second slot 120 may be the same or different. The arrows in FIGS. 4*a*-4*e* illustrates where the open end 132; 134 of the slots 112; 120 may be located. The slots in the patch affect the current distribution on the antenna. The slots can be used to modify the current distribution to enhance antenna properties, for instance increasing efficiency or introducing resonances to achieve wider impedance band. Slots can also be used to sensitize the antenna to controllable tuning capacitor for increased controllability. One option is to use the slot to decrease the user-effect of the antenna or specific absorption rate (SAR) with the user, i.e. a person handling or operating a mobile device comprising the present antenna arrangement 100.

Figure 5:
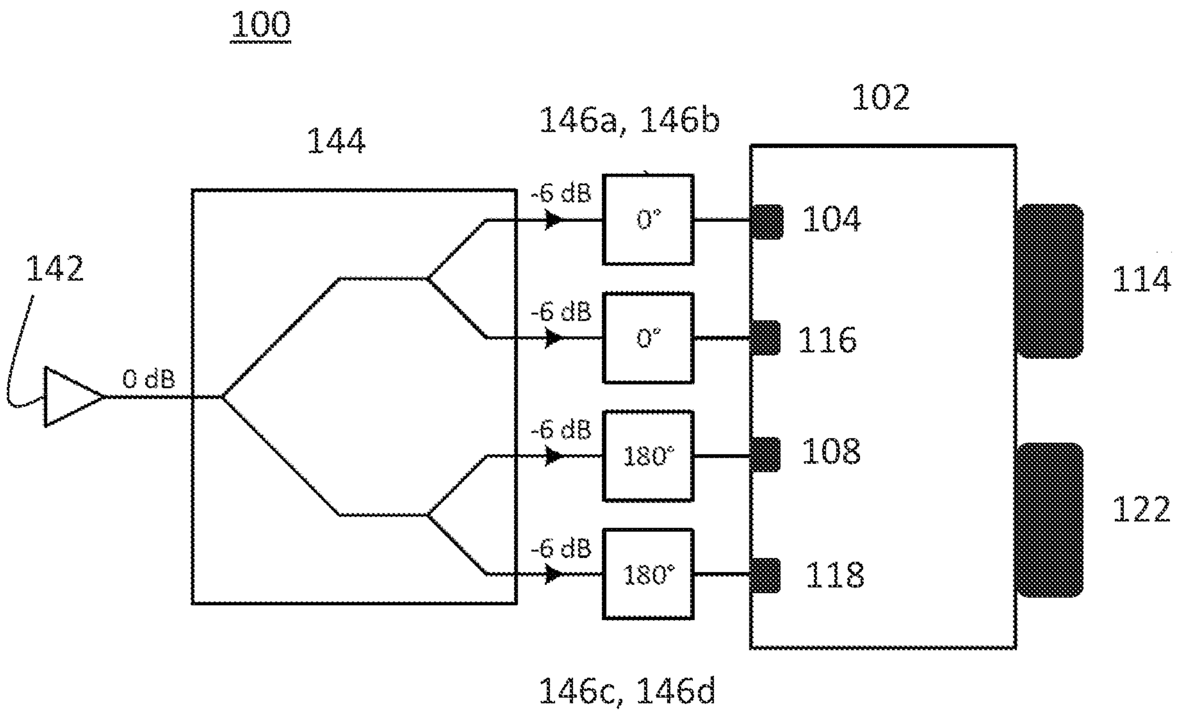
FIG. 5 shows a single feed arrangement of the antenna arrangement according to an embodiment.

FIG. 5 shows an antenna arrangement 100 according to an embodiment, where the antenna arrangement 100 comprises a single feed circuit 142. The single feed circuit 142 is connected to a power divider 144, whose output ports are subsequently connected to the coupling points of the antenna arrangement 100 with the RF signal. In the embodiment shown in FIG. 5, the antenna arrangement 100 comprises four coupling points 104, 108, 116, 118. Thus, the single feed circuit 142 is configured to carry the RF signal to all four coupling points 104, 108, 116, 118 through the power splitter 144. Fixed or controllable reactive loads, such as controllable capacitors 114 and 122 are connected to passive antenna ports, for instance at the open ends of the slots depending on the realizations.

The antenna arrangement 100 further comprises a power divider 144 coupled to the single feed circuit 142 and configured to divide the RF signal to each coupling point. In the embodiment shown in FIG. 5, this means that power divider 144 divides the RF signal from the single feed circuit 142 to each of the first coupling point 104, the second coupling point 108, the third coupling point 116 and the fourth coupling point 118. When the RF signal provided to each coupling point 104; 108; 116; 118 have the same amplitude, the four RF signals may each have an amplitude which is 6 dB less than the RF signal provided by the single feed circuit 142, as indicated in FIG. 5.

The antenna arrangement 100 further comprises a phase shifter 146*a*; 146*b*; 146*c*; 146*d* for each coupling point 104; 108; 116; 118. Each phase shifter 146*a*; 146*b*; 146*c*; 146*d* is coupled to the power divider 144 and is configured to control the phase of the RF signal provided to its respective coupling point 104; 108; 116; 118. Thus, each phase shifter 146*a*; 146*b*; 146*c*; 146*d* receives a RF signal from the power divider 144 and provides the RF signal with a specific phase to its respective coupling point 104; 108; 116; 118.

In the embodiment shown in FIG. 5, the phase shifters 146*a*, 146*b* associated with first coupling point 104 and the third coupling point 116, respectively, may be configured to provide a first phase P1, while the phase shifters 146*c*, 146*d* associated with the second coupling point 108 and the fourth coupling point 118, respectively, may be configured to provide a second phase P2 different from the first phase P1. The second phase P2 may e.g. be 180 degrees phase rotated in relation to the first phase P1. Hence, if the first phase P1 is zero phase, the second phase P2 is 180 phase rotated degrees.

Figure 6:
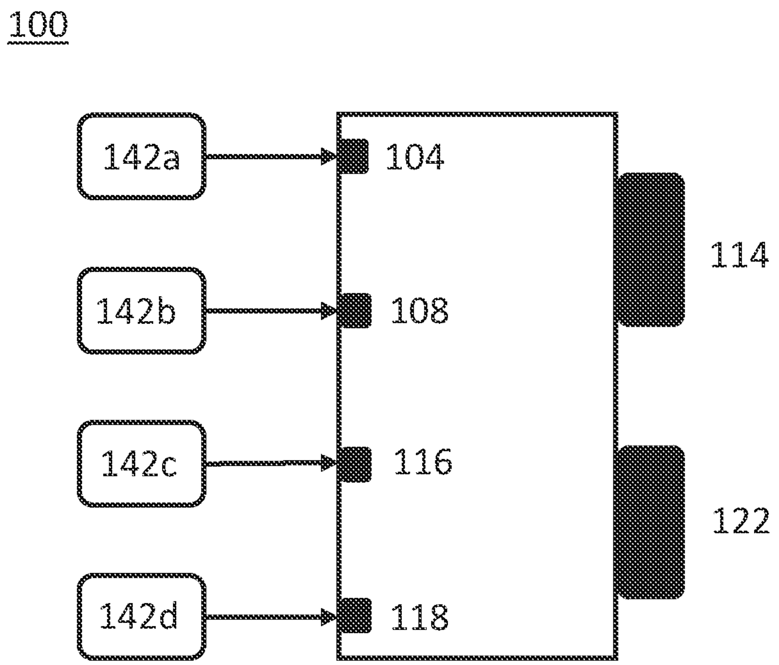
FIG. 6 shows a multiple feed arrangement of the antenna arrangement according to an embodiment.

FIG. 6 shows an antenna arrangement 100 according to an embodiment, where antenna arrangement 100 instead comprises a feed circuit 142*a*; 142*b*; 142*c*; 142*d* per coupling point 104; 108; 116; 118. The antenna arrangement 100 may hence comprises a first feed circuit 142*a* coupled to the first coupling point 104 and configured to carry the RF signal with the first phase P1, a second feed circuit 142*b* coupled to the second coupling point 108 and configured to carry the RF signal with the second phase P2, a third feed circuit 142*c* coupled to the third coupling point 116 and configured to carry the RF signal with the third phase P3, and a fourth feed 142*d* circuit coupled to the fourth coupling point 118 and configured to carry the RF signal with the fourth phase P2. As each coupling point 104; 108; 116; 118 has its own feed circuit 142*a*; 142*b*; 142*c*; 142*d*, no power divider or separate phase shifters are needed in this embodiment. Instead each feed circuit 142*a*; 142*b*; 142*c*; 142*d* can provide the RF signal with a specific phase P1; P2; P3; P4 to its associated coupling point 104; 108; 116; 118, respectively.

As previously mentioned, the first phase P1 and the third phase P3 may have the same phase and the second phase P2 and the fourth phase P4 may have the same phase, or the first phase P1, the second phase P2, the third phase P3 and the fourth phase P4 may have different phases.

In embodiments, the first feed circuit 142*a* and the third feed circuit 142*c* may hence provide the RF signal with the first phase P1 to the first coupling point 104 and the third coupling point 116, respectively, while the second feed circuit 142*b* and the fourth feed circuit 142*d* may provide the RF signal with the second phase P2 to the second coupling point 108 and the fourth coupling point 118, respectively. Alternatively, the first feed circuit 142*a*, the second feed circuit 142*b*, the third feed circuit 142*c*, the fourth feed circuit 142*d* may provide different phases P1; P2; P3; P4 to their respective coupling point 104; 108; 116; 118.

Both in embodiments where a single feed circuit 142 is used and where multiple feed circuits 142*a*, 142*b*, 142*c*, 142*d* are used, the feed circuit(s) may be implemented using at least one of vias, capacitive feeds, aperture coupling, and microstrip line feeds.

In embodiments, the top conductive patch 102 may be a metallic patch and be implemented on the substrate 150 such as e.g. a low-loss substrate such as Teflon. The top conductive patch 102 may further be a planar patch realized on a PCB. Furthermore, instead of the top conductive patch 102 being a metallic patch, the top conductive patch 102 may in embodiments be implemented as a hole in otherwise metallic structure top layer. Such a structure is a negative of previously described structures, that is, non-metal regions and metal regions are interchanged. Such negative or complementary structures are commonly used in antennas.

Figure 7:
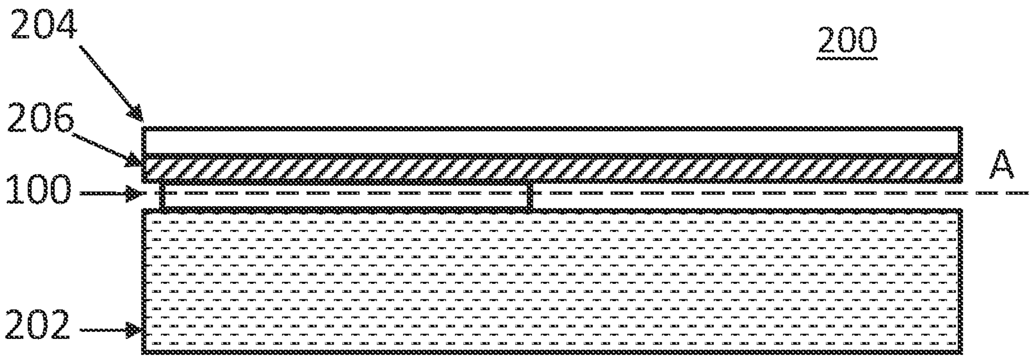
FIG. 7 shows a sideview of an antenna arrangement comprised in a communication device according to an embodiment.
Figure 8:
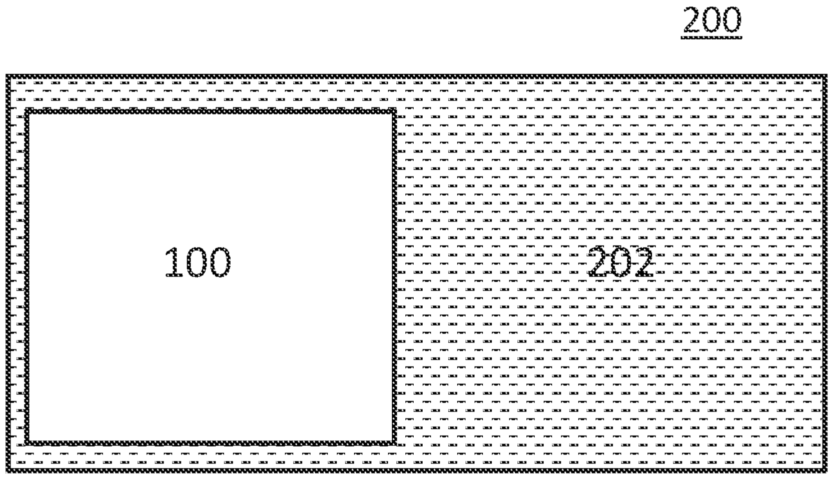
FIG. 8 shows a top view of an antenna arrangement comprised in a communication device according to an embodiment.

FIGS. 7 and 8 illustrates a communication device 200 for a wireless communication system 400 according to various embodiments. The communication device 200 comprises an antenna arrangement 100 according to any one of the herein described embodiments of the antenna arrangement 100. FIG. 7 shows a cross sectional sideview of the communication device 200, while FIG. 8 shows a top view of a plane A (shown in FIG. 7) of the communication device 200.

With reference to FIG. 7, the communication device 200 may comprise a chassis 202, a glass layer 204, and a dielectric layer 206 arranged between the chassis 202 and the glass layer 204. The communication device 200 may further comprises the antenna arrangement 100 arranged between the chassis 202 and the dielectric layer 206.

The chassis 202 may further be denoted base 202 or body 202 of the communication device 200 and may comprise one or more batteries and one or more PCB structures including one or more processors and memory devices which are not shown in FIG. 7 or 8. The dielectric layer 206 may be air or any other suitable dielectric medium such as e.g. ceramics, glass, polymer, liquid or composite of such materials. Furthermore, the glass layer 204 may be a conventional glass for communication devices and may be part of a display of the communication device 200.

In a non-limiting example, the thickness of the glass layer 204 may be 0.55 mm, the thickness of the dielectric layer 206 may be 0.3 mm, the thickness of the antenna arrangement 100 may be 0.5 mm, and the thickness of the chassis 202 may be 2.5 mm.

FIG. 8 show a top view of the communication device 200 in the plane A shown in FIG. 7 and illustrated one possible location of the antenna arrangement 100 in the chassis 202. However, the location and the size of the antenna arrangement 100 may vary depending on the design and type of communication device 200 in which the antenna arrangement 100 is being used. In a non-limiting example, the size of the antenna arrangement 100 may be 30 mm×30 mm.

Figure 9:
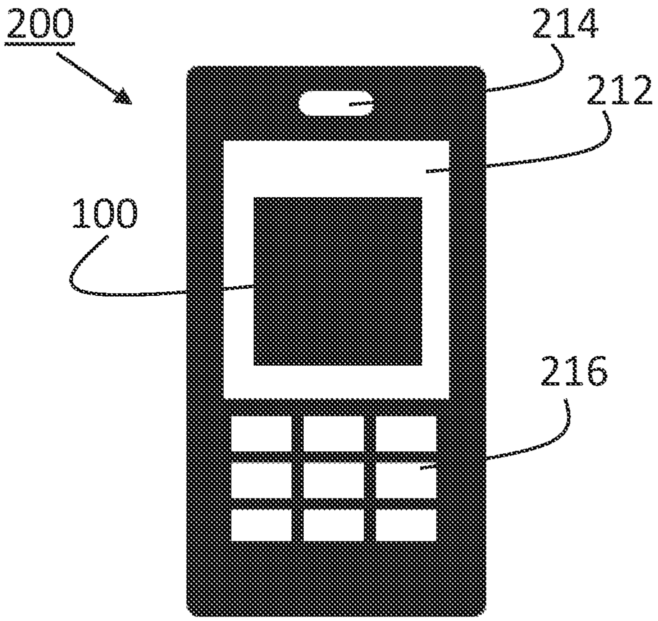
FIG. 9 shows a communication device comprising an antenna arrangement according to an embodiment.

FIG. 9 shows a communication device 200 according to various embodiments. In the embodiment shown in FIG. 9, the communication device 200 is illustrated as a client device 200 in the form of a mobile device. The mobile device 200 houses at least one processor (not shown in FIG. 9), at least one display device 212, and at least one communication means (not shown in FIG. 9). The mobile device further comprises input means e.g. in the form of a keyboard 216 communicatively connected to the display device 212. The mobile device further comprises output means e.g. in the form of a speaker 214. The mobile device further comprises an antenna arrangement 100 according to any of the various embodiments.

Figure 10:
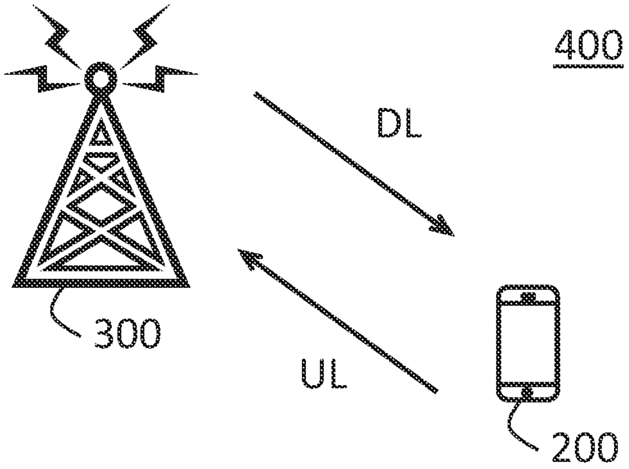
FIG. 10 shows the communication device configured to communicate in a wireless communication system.

FIG. 10 illustrates communication between a network access node 300 (such as a base station) and a communication device 200, such as e.g. the mobile device 200 shown in FIG. 9, in a wireless communication system 400, e.g. a long term evolution (LTE) or a new radio (NR) system. In such systems, communication can be performed in the downlink (DL) and in the uplink (UL) between the network access node 300 and the communication device 200. Also, so called sidelink (SL) communication can be performed between the communication device 200 and other communication devices in the communication system 400 but is not illustrated herein.

The antenna arrangement 100 may further be used to realize antennas in other challenging environments. For example, antennas on wearable and implantable devices tend to be highly lossy, and the antenna arrangement 100 can help increase the efficiency in such devices.

Additionally, very thin conformal antennas are needed in many applications. For example, automobile antennas are preferred to be visually invisible and further preferably realized either on screens or other surfaces. Conformal antennas are also needed in airplanes, trains and ships. The antenna arrangement 100 can help increase the efficiency of very thin conformal antennas.

Dish antennas used for satellite reception are often considered aesthetically problematic. Ideally satellite antennas would be thin and installed on building walls in an unobtrusive manner. Such thin planar antennas however suffer from low efficiency if realized traditionally. Thus, the antenna arrangement 100 can help increase the efficiency also in such antennas.

The first step in analytical solving of coupling point currents that maximize the radiation efficiency is to construct the far-field pattern a linear combination of port currents. The far field is $$\vec{E}(\theta,\phi) = E^{\theta}(\theta,\phi)\hat{u}_{\theta} + E^{\phi}(\theta,\phi)\hat{u}_{\phi} = \sum_{k=1}^{N} i_k \vec{K}_k(\theta,\phi), \tag{1}$$

where $\vec{K}_k = K_k^{\theta}(\theta,\phi)\hat{u}_{\theta} + K_k^{\phi}(\theta,\phi)\hat{u}_{\phi}$ maps the current $i_k$ at port k to a far-field vector. Solving current-far field-basis K for all ports requires formulation of N equations $$\vec{E}_k = \sum_{j=1}^{N} i_{k,j}\vec{K}_j, \tag{2}$$

where $\vec{E}_k$ is the far field when only port k is excited, and the remaining ports are terminated.

The current element $i_{k,j}$ is the induced current at port j, when port k is excited. Now the port specific far fields can be defined as a matrix decomposition for each angle and frequency $$E(\theta,\phi) = IK(\theta,\phi), \tag{3}$$

where E and K are column vectors with a length of N containing elements $\vec{E}_k$ and $\vec{E}_j$, respectively. I is a N×N matrix containing element $i_{k,j}$. When the far fields and current for individual port excitations are known, it is straight forward to compute K.

When the current-far field-basis K is known, we can compute the radiation efficiency corresponding any current excitation vector $$I = [i_1 \ldots i_k \ldots i_N]^T \tag{4}$$

with $i_k$ being total current at port k.

Now the time-averaged power radiated to the far field can be expressed as $$P_{rad} = \frac{1}{2\eta}\int\int_{\Omega}|E|^2\sin\theta d\theta d\phi = \Delta\theta\Delta\phi\frac{1}{2\eta}I^H\hat{K}^H\hat{K}I, \tag{5}$$

where $\Delta\theta = \theta_{p+1} - \theta_p$, $\Delta\phi = \phi_{q+1} - \phi_q$ and $$\hat{K} = [\hat{K}_1 \ldots \hat{K}_k \ldots \hat{K}_N]. \tag{6}$$

$\hat{K}_k$ is a column vector containing elements $$K_k^{pol}(\theta_p,\phi_q)\sqrt{\sin\theta_p}, pol \in \{\theta,\phi\}, p \in [1 \ldots P]^{-}, q \in [1 \ldots Q].$$

Thus, the size of the matrix is 2PQ×N.

The power accepted to the antenna structure is calculated from the port voltages and currents $$S_{acc} = \tfrac{1}{2}U^H I = \tfrac{1}{2}(ZI)^H I = \tfrac{1}{2}I^H Z^H I, \tag{7}$$

where Z is the impedance matrix of the N-port antenna. However, only the real part of the power contributes to the radiated power, i.e.

$$P_{acc} = \mathbb{R}\{S_{acc}\} = \tfrac{1}{4}I^H(Z^H + Z)I. \tag{8}$$

As a result, the radiation efficiency can be written in terms of two powers as $$\eta_{rad} = \frac{P_{rad}}{P_{acc}} = \frac{2}{\eta}\Delta\theta\Delta\phi\frac{I^H\hat{K}^H\hat{K}I}{I^H(Z^H + Z)I}. \tag{9}$$

The computed radiation efficiency has a general from of Rayleigh quotient, which can be solved as a general eigenvalue problem for currents I. The maximum radiation efficiency is obtained by $$\eta_{rad,max} = \frac{2}{\eta}\Delta\theta\Delta\phi \max\left\{eig\left(\hat{K}^H\hat{K}, Z^H + Z\right)\right\} \quad (10)$$

with corresponding eigenvector giving the optimal currents.

Embodiments disclosed herein have improved performance compared to conventional solutions. It has been concluded that the radiation efficiency of the present antenna arrangement may be approximately from −6 dB to −2 dB. The total efficiency is increased as well from below −6 dB to above −4 dB. While the total efficiency increases the overall shape of the radiation pattern remains similar for the present antenna arrangement. Also, the beam-width is larger for the present antenna arrangement and the radiation to back direction is reduced by approximately 5 dB compared to conventional solutions.

Further, the total active reflection coefficient of the antenna can be shifted as the capacitance value is changed. The total efficiency of approximately more than −5.8 dB is achievable between 3.3-4.2 GHz, while the instantaneous bandwidth is 100 MHz when the capacitance value is varied between 0.847-2.96 pF.

Non-limiting example values for a variable capacitance (also known as a varicap) may be between 0.4-5.0 pF, such as between 0.4-2.5 pF or 1.0-5.0 pF depending on application. The tuning range of the variable capacitance may e.g. be 1:5.

The communication device 200 or mobile device 200 in this disclosure includes but is not limited to: a UE such as a smart phone, a cellular phone, a cordless phone, a session initiation protocol (SIP) phone, a wireless local loop (WLL) station, a personal digital assistant (PDA), a handheld device having a wireless communication function, a computing device or another processing device connected to a wireless modem, an in-vehicle device, a wearable device, an integrated access and backhaul node (IAB) such as mobile car or equipment installed in a car, a drone, a device-to-device (D2D) device, a wireless camera, a mobile station, an access terminal, an user unit, a wireless communication device, a station of wireless local access network (WLAN), a wireless enabled tablet computer, a laptop-embedded equipment, an universal serial bus (USB) dongle, a wireless customer-premises equipment (CPE), and/or a chipset. In an Internet of things (IOT) scenario, the communication device 200 may represent a machine or another device or chipset which performs communication with another wireless device and/or a network equipment. The UE may further be referred to as a mobile telephone, a cellular telephone, a computer tablet or laptop with wireless capability. The UE in this context may e.g. be portable, pocket-storable, hand-held, computer-comprised, or vehicle-mounted mobile device, enabled to communicate voice and/or data, via the radio access network, with another entity, such as another receiver or a server. The UE can be a station (STA), which is any device that contains an IEEE 802.11-conformant media access control (MAC) and physical layer (PHY) interface to the wireless medium (WM). The UE may also be configured for communication in 3GPP related LTE and LTE-Advanced, in WiMAX and its evolution, and in fifth generation wireless technologies, such as NR.

Moreover, it is realized by the skilled person that embodiments of the communication device 200 comprises the necessary communication capabilities in the form of e.g., functions, means, units, elements, etc., for performing the solution. Examples of other such means, units, elements and functions are: processors, memory, buffers, control logic, encoders, decoders, rate matchers, de-rate matchers, mapping units, multipliers, decision units, selecting units, switches, interleavers, de-interleavers, modulators, demodulators, inputs, outputs, antennas, amplifiers, receiver units, transmitter units, DSPs, MSDs, TCM encoder, TCM decoder, power supply units, power feeders, communication interfaces, communication protocols, etc. which are suitably arranged together for performing the solution.

Especially, the processor(s) of the communication device 200 may comprise, e.g., one or more instances of a Central Processing Unit (CPU), a processing unit, a processing circuit, a processor, an Application Specific Integrated Circuit (ASIC), a microprocessor, or other processing logic that may interpret and execute instructions. The expression "processor" may thus represent a processing circuitry comprising a plurality of processing circuits, such as, e.g., any, some or all of the ones mentioned above. The processing circuitry may further perform data processing functions for inputting, outputting, and processing of data comprising data buffering and device control functions, such as call processing control, user interface control, or the like.

Finally, it should be understood that the invention is not limited to the embodiments described above, but relates to and incorporates all embodiments within the scope of the appended independent claims.

What is claimed is:

1. An antenna arrangement for a communication device, the antenna arrangement comprising:

a substrate having a top surface and a bottom surface;

a top conductive patch arranged on the top surface, the top conductive patch comprising a first section and a second section adjoining the first section;

a bottom conductive patch arranged on the bottom surface opposite to the top conductive patch; and one or more feed circuits configured to carry a radio frequency (RF) signal to or from the top conductive patch, wherein the top conductive patch comprises a plurality of coupling points at which the top conductive patch is coupled to the one or more feed circuits, the plurality of coupling points comprising:

a first coupling point located in the first section and a second coupling point located in the second section such that the RF signal has a first phase at the first coupling point and a second phase at the second coupling point, and a third coupling point located in the first section and a fourth coupling point located in the second section such that the RF signal has a third phase at the third coupling point and a fourth phase at the fourth coupling point, and wherein a first slot extends in the top conductive patch between the first coupling point and the second coupling point and a second slot extends in the top conductive patch between the third coupling point and the fourth coupling point.

2. The antenna arrangement according to claim 1, further comprising a first controllable capacitor arranged at the first slot and configured to vary the electrical length of the first slot.

3. The antenna arrangement according to claim 2, wherein the first slot has an open end and a closed end, and wherein the first controllable capacitor is arranged between the open end and the closed end of the first slot.

4. The antenna arrangement according claim 1, wherein the second phase is phase rotated by 180 degrees in relation to the first phase.

5. The antenna arrangement according to claim 1, wherein:

the first phase and the third phase have the same phase and the second and the fourth phase have the same phase; or the first phase, the second phase, the third phase and the fourth phase have different phases.

6. The antenna arrangement according to claim 1, further comprising:

a first controllable capacitor arranged at the first slot and configured to vary the electrical length of the first slot; and a second controllable capacitor arranged at the second slot and configured to vary the electrical length of the second slot.

7. The antenna arrangement according to claim 6, wherein the second slot has an open end and a closed end, and wherein the second controllable capacitor is arranged between the open end and the closed end of the second slot.

8. The antenna arrangement according to claim 7, wherein the open end of the first slot and the open end of the second slot are arranged on opposite sides of the top conducting patch.

9. The antenna arrangement according to claim 8, wherein the first slot and the second slot extend in opposite directions and are aligned with each other.

10. The antenna arrangement according to claim 8, wherein the first slot and the second slot at least partially demarcate the first section from the second section.

11. The antenna arrangement according to claim 6, wherein the first controllable capacitor is configured to vary the electrical length of the first slot independently of the electrical length of the second slot, and wherein the second controllable capacitor is configured to vary the electrical length of the second slot independent of the electrical length of the first slot.

12. The antenna arrangement according to claim 1, wherein the first coupling point, the second coupling point, the third coupling point and the fourth coupling point are symmetrically arranged on the top conductive patch.

13. The antenna arrangement according to claim 1, wherein the RF signal has a same amplitude at each coupling point.

14. The antenna arrangement according to claim 1, wherein the one or more feed circuits consists of a single feed circuit configured to carry the RF signal, the antenna arrangement further comprising:

a power divider coupled to the single feed circuit and configured to divide the RF signal to each coupling point, and a respective phase shifter for each respective coupling point, wherein each respective phase shifter is coupled to the power divider and is configured to control a respective phase of the RF signal provided to its respective coupling point.

15. The antenna arrangement according to claim 1, comprising at least one of:

a first feed circuit configured to carry the RF signal with the first phase, a second feed circuit configured to carry the RF signal with the second phase, a third feed circuit configured to carry the RF signal with the third phase, or a fourth feed circuit configured to carry the RF signal with the fourth phase.

16. A communication device for a wireless communication system, the communication device comprising an antenna arrangement according to claim 1.

17. The communication device according to claim 16, further comprising:

a chassis;

a glass layer; and a dielectric layer arranged between the chassis and the glass layer, wherein the antenna arrangement is arranged between the chassis and the dielectric layer.

18. The antenna arrangement according to claim 1, wherein the first phase, the second phase, the third phase, and the fourth phase have different phases.

19. The antenna arrangement according to claim 1, wherein the first slot and the second slot have different lengths and/or shapes.

* * * * *